US007257817B2

(12) United States Patent
Cabrera et al.

(10) Patent No.: US 7,257,817 B2
(45) Date of Patent: Aug. 14, 2007

(54) VIRTUAL NETWORK WITH ADAPTIVE DISPATCHER

(75) Inventors: Luis F. Cabrera, Bellevue, WA (US); Erik B. Christensen, Seattle, WA (US); Giovanni M. Della-Libera, Seattle, WA (US); Christopher G. Kaler, Sammamish, WA (US); David E. Levin, Redmond, WA (US); Bradford H. Lovering, Seattle, WA (US); Steven E. Lucco, Bellevue, WA (US); Stephen J. Millet, Edmonds, WA (US); John P. Shewchuk, Redmond, WA (US); Robert S. Wahbe, Seattle, WA (US); David A. Wortendyke, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 990 days.

(21) Appl. No.: 09/993,656

(22) Filed: Nov. 27, 2001

(65) Prior Publication Data

US 2003/0101284 A1     May 29, 2003

Related U.S. Application Data

(60) Provisional application No. 60/329,796, filed on Oct. 16, 2001, provisional application No. 60/346,370, filed on Oct. 19, 2001.

(51) Int. Cl.
*G06F 3/00*      (2006.01)

(52) U.S. Cl. ...................................... 719/310

(58) Field of Classification Search ................ 719/310, 719/313
See application file for complete search history.

(56) References Cited

U.S. PATENT DOCUMENTS 5,224,098 A * 6/1993 Bird et al. ................... 709/233
5,608,551 A * 3/1997 Biles et al. .................... 349/95

(Continued)

OTHER PUBLICATIONS

"TIBCO Rendezvous—a TIBCO Active Enterprise Product", tibco.com/products/rv/index.html printed Dec. 10, 2001, 2 Pages.

(Continued)

*Primary Examiner*—William Thomson
(74) *Attorney, Agent, or Firm*—Banner & Witcoff, Ltd.

(57) ABSTRACT

Methods and systems for providing a virtual network are disclosed. At least one layer of abstraction is created between network service applications and conventional network protocols by inserting an adaptive dispatcher between applications and network transport services on each machine in a network. The message protocol in the virtual network is extensible, allowing application programs to create new headers within any message as needed. The adaptive dispatcher contains handlers that route and dispatch messages within the virtual network based on arbitrary content within each message, including any combination of headers and/or data content. Each device on the virtual network has a virtual address to which messages are directed, allowing devices to move within the network without reconfiguring routing tables. Handlers may be automatically created when an event meeting predefined criteria occurs, including the non-occurrence of a condition, making the virtual network self-healing and adaptive to reconfiguration.

33 Claims, 8 Drawing Sheets

U.S. PATENT DOCUMENTS

| | | | | |
|---|---|---|---|---|
| 5,680,551 | A | * | 10/1997 | Martino, II .................. 709/226 |
| 5,761,477 | A | | 6/1998 | Wahbe et al. |
| 5,935,219 | A | * | 8/1999 | Holmes ....................... 719/315 |
| 6,006,259 | A | | 12/1999 | Adelman et al. |
| 6,119,171 | A | | 9/2000 | Alkhatib |
| 6,151,618 | A | | 11/2000 | Wahbe et al. |
| 6,233,619 | B1 | * | 5/2001 | Narisi et al. ................. 709/230 |
| 6,243,749 | B1 | | 6/2001 | Sitaraman et al. |
| 6,453,356 | B1 | * | 9/2002 | Sheard et al. ................ 709/231 |
| 6,667,974 | B1 | * | 12/2003 | Shigeta ........................ 370/389 |
| 6,748,453 | B2 | * | 6/2004 | Law et al. ................... 719/314 |

OTHER PUBLICATIONS

"TIBCO Rendezvous TX—a TIBCO Active Enterprise Product", tibco.com/products/rv/rvtx.html printed Dec. 10, 2001, 2 Pages.

"TIBCO Enterprise for JMS", tibco.com/products/enterprise_for_jms.html printed Dec. 10, 2001, 1 Page.

Henrik F. Nielsen et al., "SOAP Routing Protocol" gotdotnet.com/team/xml_wsspecs/soap-rp/default.html, May 23, 2001, 36 Pages.

G. Robert Malan et al., "An Extensible Probe Architecture for Network Protocol Performance Measurement", Department of Electrical Engineering And Computer Science, University of Michigan, SIGCOMM 1998, Vancouver, pp. 215-227.

Kunihiko Toumura et al., "Implementing Multiple Name Spaces Using An Active Network Technology", Jun. 2000, pp. 1665-1676.

David Potter et al., "Connecting minis to local nets with discrete modules", Data Communications, Jun. 1983, pp. 161-164.

Steven M. Dean et al., "CONE: A Software Environment for Network Protocols", Hewlett-Packard Journal, Feb. 1990, pp. 18-28.

Fumiko Kouda et al., "Representation Of Descriptive Name and the Resolution Method with a Semantic Network Structure", Journal of Information Processing, vol. 15, No. 2, 1992, pp. 280-292.

Henrik F. Nielsen et al., "Direct Internet Message Encapsulation", May 23, 2001, 13 Pages.

B. Ramsey, "An RTOS with its Nest is pure dynamite", Electronic Engineering Times, Sep. 11, 1995, No. 865, p. 76, 3 pages.

Richard Bowers, "Apple's Free Internet Domain Name Server Software", Post-Newsweek Business Information, Inc., May 2, 1996, 1 page.

* cited by examiner

VIRTUAL MAPPING TABLE

| VIRTUAL ADDRESS | PHYSICAL ADDRESS |
|---|---|
| HTTP://WWW.FOO.COM/ | HTTP://1.2.3.5/FOO.HTM |
| JOE | HTTP://12.34.56.78/USERS/JOE |
| GAMESERVER | HTTP://WWW.MSN.COM/GAMES |
| NEWS | HTTP://WWW.MSNBC.COM |
| EMAIL | HTTP://MAIL.MSN.COM |
| FTPSERVER | FTP://FTP.MSN.COM |

FIG. 12

VIRTUAL MAPPING TABLE

| VIRTUAL ADDRESS | PHYSICAL ADDRESS |
|---|---|
| HTTP://WWW.FOO.COM/ | HTTP://6.7.8.11/FOO.HTM |
| JOE | HTTP://12.34.56.78/USERS/JOE |
| GAMESERVER | HTTP://WWW.MSN.COM/GAMES |
| NEWS | HTTP://WWW.MSNBC.COM |
| EMAIL | HTTP://MAIL.MSN.COM |
| FTPSERVER | FTP://FTP.MSN.COM |

FIG. 13

VIRTUAL NETWORK WITH ADAPTIVE DISPATCHER

CROSS-REFERENCE TO RELATED APPLICATIONS

This application relates to and claims priority from U.S. Provisional Application Ser. No. 60/329,796, filed Oct. 16, 2001, and U.S. Provisional Application Ser. No. 60/346,370, filed Oct. 19, 2001, each of which is herein incorporated by reference.

FIELD OF THE INVENTION

The invention relates generally to computer networks. More specifically, the invention relates to a virtual network that adaptively routes messages based on message contents.

BACKGROUND OF THE INVENTION

Various levels of abstraction exist within computer architecture, from the physical representation of ones and zeros to high-level application programs. When computers were initially developed, a low-level programming language commonly referred to as machine language was generally used to control their operation. However, in order to create the same program for two different computer platforms with different machine languages, programmers had to write the program twice-once in each platform's machine language.

Computer programmers learned that machine language could be abstracted by creating higher-level programming languages, such as C and Pascal, and then providing a compiler for each platform on which the program was to be used. When a program was written in one of these higher-level programming languages, the program could be compiled to run on each specific machine, without having to rewrite the source program for each machine. Abstractions in this regard continued, resulting in the more recent development of virtual machines.

The notion of a virtual machine is well known in the art of computer science. A virtual machine is an intermediate representation that is not tied to the specific details of a particular computer hardware architecture. Typically a virtual machine will guarantee certain semantics that remain identical regardless of the hardware used to implement it. Therefore a program which has been written for such a machine can be executed on different hardware systems without modification. Thus, one advantage of a virtual machine is that its operational semantics remain constant from one computer program to the next regardless of the origin or operating requirements of any one computer program.

Computer networks are dependent on the underlying physical hardware and network protocols on which the network is constructed. These protocols in turn are dependent on the underlying network architecture on which they are implemented. As a result, network applications must be rewritten for each network on which they are to be used. In addition, in order for two machines to communicate over a network, each machine must understand how to communicate over the specific network, i.e., each machine must have the appropriate network drivers to communicate.

One level of abstraction that has been implemented in computer networks is the use of a TCP/IP protocol stack, as implemented according to the OSI seven-layer network model. TCP/IP abstracts some notions of network protocols, allowing two machines that each understand the TCP/IP protocols to effectively communicate with each other. However, even using TCP/IP, each machine must, at some level, be able to understand network routing and topology, bindings, and DNS resolution. That is, each computer on a network must still have substantial network support utilities installed in order to effectively communicate over the network, because the OSI model only virtualizes the physical wire between the machines, and not the network through which the machines communicate.

For example, TCP/IP requires applications to understand the concepts of ports and IP addresses. Ports and IP addresses, in turn, require applications to understand DNS name resolution, network topology, transport bandwidths and end-to-end routing. Thus, while simplifying the model for exchanging ordered sequences of bytes in a reliable manner, the application still must deal directly with many network level concepts and details. The OSI model does not address higher-level constructs, such as naming, routing, and quality of service, as needed by network applications.

Another shortcoming of conventional networks is the inability to adapt and rehabilitate after a message error or network failure. Present networks cannot easily adapt automatically when machines are added, moved, or removed. That is, a user typically must edit routing tables to inform the network of the change.

In addition, network failures are not easily fixed, other than by maintaining redundant machines that perform the same function. That is, if a first machine fails, then the second (backup) machine takes over the first machine's functions. However, if the second machine subsequently fails, and there is no third machine that performs the same functions, the network will suffer as a result. Known networks are not self-healing. Thus, an advanced network that overcomes these problems is needed.

Another shortcoming of conventional networks is their inability to dynamically route network messages based on message contents. Known routers by Cisco Systems, Inc. are capable of routing messages based on predefined criteria, but are not dynamically programmable to support user-extensible routing behavior based on message content. This inability makes them inappropriate for systems in which applications can control transformations and processing of messages, in addition to the traditional routing and QoS requirements.

It would be an advancement in the art to provide a method and system that solves some or all of the above-identified problems.

BRIEF SUMMARY OF THE INVENTION

Aspects of the invention may be used to virtualize a network to allow programmers to write platform independent network computer applications. A virtual network may be created by adding an abstraction layer (software or hardware) between the applications providing network services and the underlying network of systems that executes that code, for example, between layers 6 and 7 in the OSI network model. One or more virtualized components may be inserted, including synchronization, eventing, messaging, naming, groups, addressing, and routing components.

By abstracting the networking system, the network may more efficiently and securely provide services inherently to the applications and services built on top of it. For example, services such as reliability, security, platform independence, scale-out, edge networking, and location independence may easily be provided. Also, the system may adapt to physical topology changes and automatically "heal" from failures.

The virtual network is responsible for mapping code onto the physical topology of the network and transparently adapting that mapping. Additionally, developers may benefit from isolation of their services.

By combining the virtual network with a virtual machine, a distributed, partitionable virtual network can be created where an application can be written once and run on any machine. That is, a network application written for use in a virtual network, and on a computer running a virtual machine, does not need to be rewritten because it is able to run on any machine that operates the same virtual machine and is connected to the virtual network.

The virtual network also provides adaptive reconfiguration capabilities. Suppose that machine A sends a message to machine B over a network, and B replies back to machine A. However, before machine A can send a second message to machine B, machine B moves (e.g., to another IP address). According to one embodiment, a virtual network may resolve itself and adapt to the changed location such that the message is still delivered to B's new location. The address change may take place transparently so that the applications running on the network(s) never know (or need to know) that a change in B's location was made. No restrictions are placed on the set of locations to which each machine may be moved because abstraction is moved from the machine level to the network level. After a device has been moved, once it identifies itself to the network at the new location the virtual network has the ability to update itself so that the routing to the machine can continue to operate uninterrupted. This ability extends what is currently possible within single administrative domains to multiple administrative domains, enabling location mobility to extend across organizations.

A first embodiment of the invention provides an apparatus that includes a message dispatcher that routes and dispatches messages. Each message is routed based on an arbitrary portion of the message's contents. There is also an interface through which network application programs communicate with the message dispatcher to define the arbitrary portion of the message's contents on which the message is routed.

In another embodiment of the invention, there is a data processing apparatus that includes a message dispatcher module, a transport adapter for interfacing the message dispatcher to a transport protocol, an interface through which application programs communicate with the message dispatcher, and stored rules instructing the message dispatcher to route a first network message based on a first attribute of said first network message, and route a second network message based on a second attribute, different from the first attribute, of the second network message. The first and second attributes are selected from a set of headers and data contained in each network message.

Another embodiment provides a method for routing network messages. A message dispatcher routes a first network message based on a first attribute of the first network message. The message dispatcher routes a second network message based on a second attribute, different from the first attribute, of the second network message. The first and second attributes may be any field selected from a set of headers and data of each network message.

In another embodiment, there is a network router that stores computer executable instructions that, when executed by the router, perform a set of steps. The network router stores routing information received from a network application. The routing information comprises a message field, a field condition, and a message instruction. The network router receives and processes a network message by comparing the network message to the stored routing information. When the received message's message field meets the field condition, the network router performs the message instruction.

Another embodiment of the invention provides a virtual computer network. The computer network includes a plurality of computers, each configured with at least one transport adapter that converts messages between a transport layer protocol and a network protocol, and a message dispatcher that routes and dispatches messages based on an arbitrary portion of the message's contents. The message dispatcher in each computer routes messages in the virtual network protocol over the transport layer protocol using the transport adapter(s).

In another embodiment of the invention, there is a virtual network that includes at least one virtualized component inserted between layers 6 and 7 of an OSI protocol stack.

BRIEF DESCRIPTION OF THE DRAWINGS

FIG. 12 illustrates a sample virtual mapping table.

FIG. 13 illustrates the sample virtual mapping table of FIG. 12 after the system has adapted to a machine failure.

DETAILED DESCRIPTION OF THE INVENTION

Figure 1:
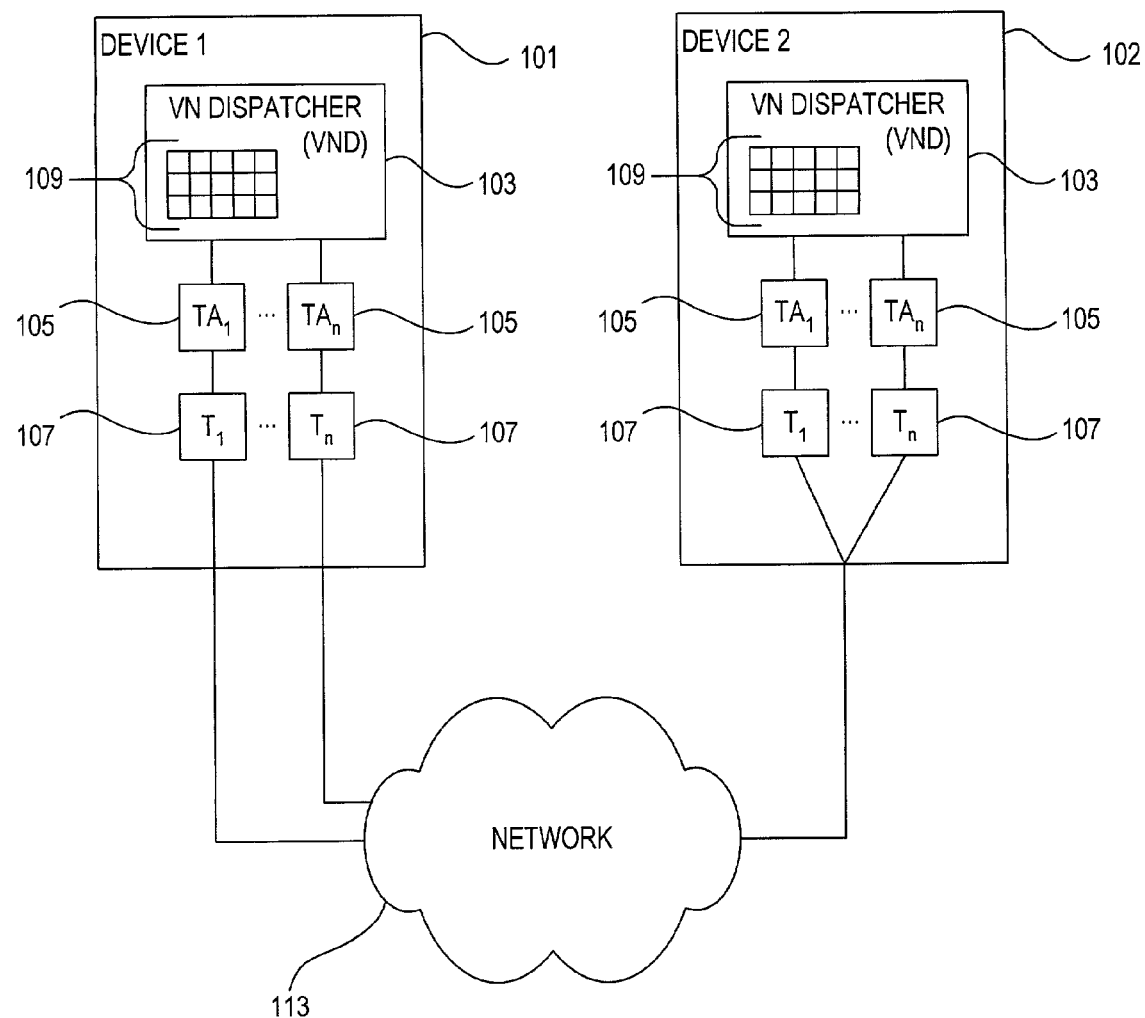
FIG. 1 illustrates a block diagram of two nodes in a virtual network according to an embodiment of the invention.

Message resolution in a virtual network can be accomplished through the use of virtual locations in combination with a universal enabling component, referred to as a virtual network dispatcher (VND), which is included in every resource that participates within the virtual network. A resource may be defined as any message endpoint. With reference to FIG. 1, every device 101-102 on a virtual network 113 is given a virtual address to which its actual address (such as an IP address, MAC address, URL, or other location identifier) may be mapped. The VND 103 may comprise a router module integrated within each device that, using either hardware or software, responds in the same manner to a message regardless of the device on which the router is installed. That is, the router module is device independent. VND 103 includes message handlers 109, further described below.

Message handlers 109 may vary from machine to machine, or they may be consistent across machines. Each message handler may be explicitly configured for a specific type of machine, or may be configured to specifically operate or not operate on any given machine. Some message handlers may be broadly deployed, e.g., message header handlers and encryption handlers, while other message handlers may only be deployed on a single machine.

Each VND is responsible for performing routing and dispatching functions. Routing is the process of forwarding messages to the device for which they are intended. Dispatching is the process of, upon receiving a message, executing the proper handler (e.g., a software module, function, application program, routine, etc.) or other executable software, in response to receiving the message. The handler that the VND executes may be a routing handler that determines how the VND should process and route the message, or the handler may send the message to an application program running on the device.

In one embodiment, the VND may route and dispatch XML-based messages in an open, extensible messaging protocol that allows distributed, decentralized applications to exchange information regardless of the operating system, object model, or language that each particular application uses. Any protocol may be used that supports the transport(s) used by the virtual network. The VND may be used in conjunction with network transport protocols 107, e.g. TCP, IP, UDP, HTTP, SMTP, SOAP-RP, etc. As messages are received at a location via any transport protocol, the message contents are extracted by a transport adapter 105, and input into VND 103. Each transport adapter receives as input a message formatted according to a predefined transport protocol, and converts (or strips) the message headers to comply with the virtual network protocol. As shown in FIG. 1, each VND 103 may be connected to multiple transport adapters $TA_1$-$TA_n$ for use with multiple transport protocols $T_1$-$T_n$. This allows each VND to be used across multiple transports, without tying the virtual network to a single transport protocol.

By using multiple transport protocols and protocol adapters, placing a VND 103 on each device provides a platform through which any application program may transparently communicate with another application program independently of the transport layer protocol by using the virtual network protocol. Known in the art are specific application programs that have been configured to communicate over multiple protocols. However, each application program that does so must be specifically configured. Using the virtual network described herein, applications may communicate over multiple protocols without any special configuration, and without even being aware that communications are being transported over multiple protocols. The VND 103 in each specific device sending each message makes the decision regarding the protocol over which to send the message. For each message, a VND may determine which protocol to use based on one or more predefined protocol policies. Alternatively, the protocol used may be dependant on the application or web service driving the VND for the particular message, based on the needs and/or requests of the application or web service.

When a new transport protocol is developed or needed by the virtual network, a new transport adapter may be created and installed for use with each VND. In this manner, the virtual network may take advantage of new transport protocols, without requiring support for each transport protocol to be built into each application in the virtual network. Instead, support for a new transport protocol is provided to each VND, which contains logic instructing when and how to use the new transport protocol in conjunction with the new transport adapter.

The VND unifies local and remote dispatch on a single machine. Unlike conventional networks where only specified or dedicated machines act as routers, typically every device acts as a router in a virtual network. For instance, a device may receive a message, only to determine that the message should actually be delivered somewhere else in the network. When this occurs, the machine forwards the message to the correct recipient, or to that recipient which the machine believes is the correct based on its present routing tables and rules, instead of (optionally) returning an error message to the message sender.

Figure 10:
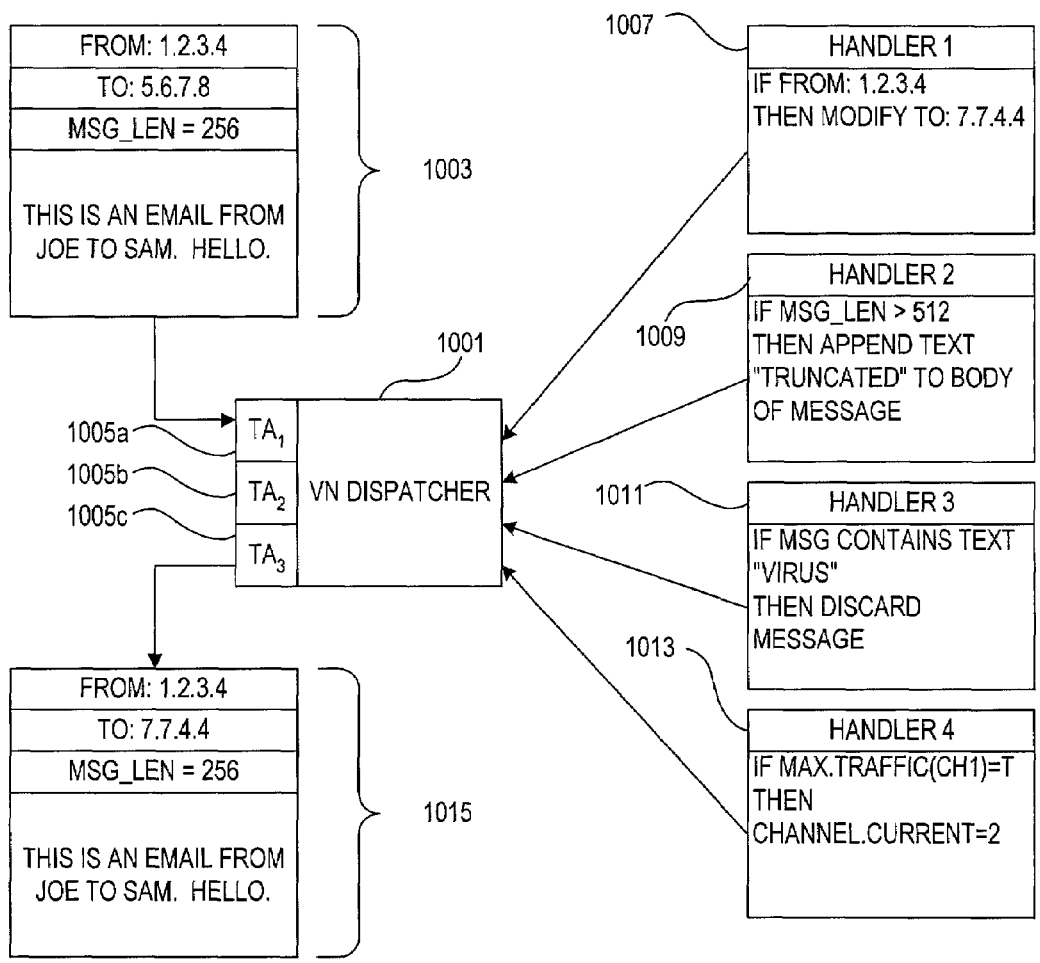
FIG. 10 illustrates data flow through a virtual network dispatcher according to an embodiment of the invention.

FIG. 10 illustrates a message routing example according to an embodiment of the invention. A VND 1001 receives incoming message 1003, with FROM field populated with 1.2.3.4, via transport adapter 1005a. VND 1001 may include multiple transport adapters 1005a, 1005b, and 1005c for use with multiple transport protocols. VND 1001 processes received message 1003 using handlers 1007-1013, each of which instructs VND 1003 to route and/or dispatch messages based on predefined criteria. VND 1001, based on handler 1007, modifies the message's TO field to 7.7.4.4, and outputs routed message 1015 through transport adapter 1005c. Routed message 1015 includes a TO field populated with destination address 7.7.4.4, based on incoming message 1003's FROM field indicating 1.2.3.4.

Because each device acts as a router, a self-healing system may be implemented. When one machine goes down, other machines will automatically compensate and find other paths through which to send messages, making the virtual network fault tolerant. In one embodiment, machines may be placed in redundancy groups. Each machine in the redundancy group can detect that any other machine in the group has failed and left the group. The remaining machines may then update information in one or more message handlers that forward messages to avoid using the machine that is known to be down. Machines can thus compensate for network faults and errors according to instructions encoded in their routing and logic tables, and as further described below. In another embodiment, one or more machine subsystems may be monitoring the network to determine optimal paths and failed paths.

Figure 2:
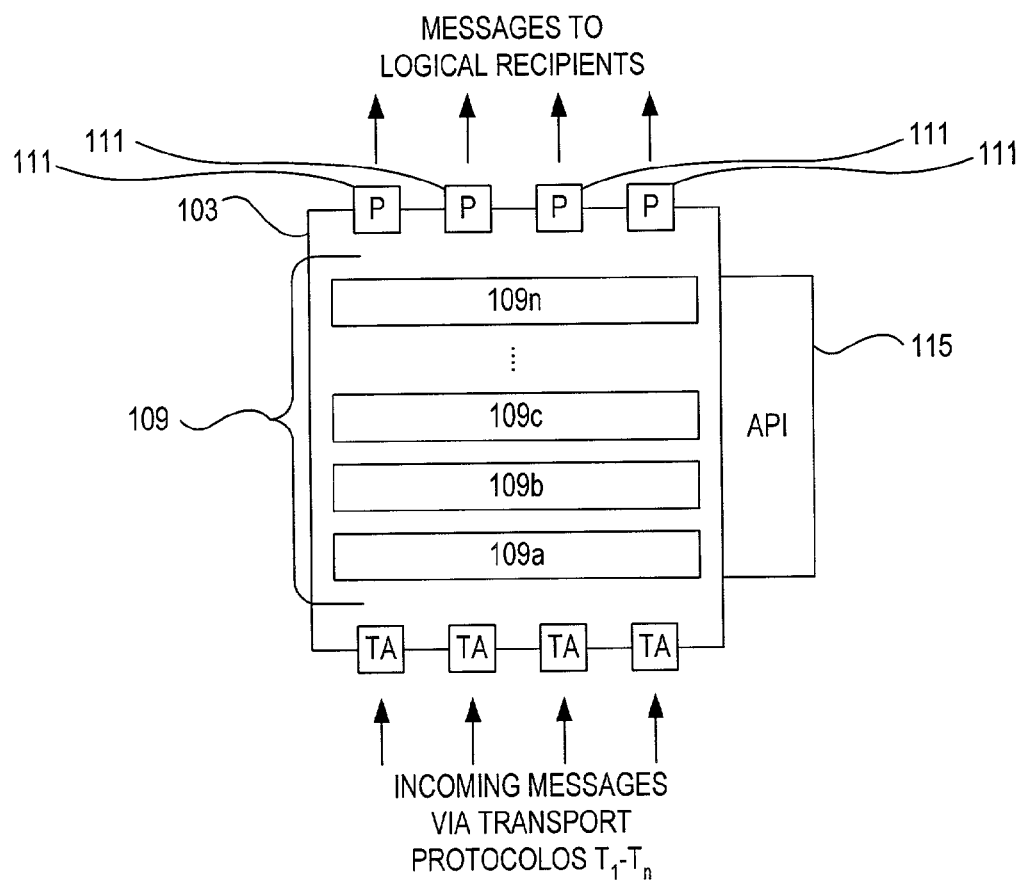
FIG. 2 illustrates a block diagram of a virtual network dispatcher according to an embodiment of the invention.

With reference to FIG. 2, handlers 109 contain logic instructing VND 103 how to process messages, i.e., how to handle incoming messages, how to respond to messages, and how to forward messages. For instance, a first handler $109_a$ may perform virus checking, a second handler $109_b$ may perform security functions, a third handler $109_c$ may perform reliability functions, etc. An unlimited number of handlers 109 may be used, as illustrated in FIG. 2 by $109_n$. New functionality and capabilities may be added to the virtual network by adding a new handler 109 at any given time, without having to modify network applications on each machine. Processed messages are output through logical recipient ports 111. Logical endpoints may be mapped to any physical port on the device from which the message is being sent.

VND handlers 109 may be created such that, in a virtual network, the application network presents to each application a set of logical endpoints, i.e. devices. Applications may communicate with endpoints via messages that use non-uniform semantic rules. For example, a first application may send a message over the network to a second application according to a first message format (e.g., headers and data). One or more handlers can modify the message syntax such that the message is modified before it is received by the second application, and appears in a different message syntax. The endpoints may be mapped onto a physical network that may have varying implementations at each endpoint (i.e., different vendors may provide software and hardware to operate the virtual network once the specifications are publicly available), and may communicate using non-uniform transport protocols between endpoints.

Using the above-described network platform, a virtual network may be configured to be self-organizing. That is, the virtual network may be configured to recover from, adapt to, or reorganize itself in response to a specified event on the network. An event could be any predefined condition that triggers the network self-adaptation, including the nonoccurrence of a condition. For instance, the network may be configured to reorganize when it detects that a node of the network has failed. When this event occurs, one or more handlers may instruct the VND to route packets to a new location. In another example, when load on a network path is high, VNDs may route messages over lesser-trafficked network paths. Alternatively, a user may reorganize the virtual network via a graphical user interface, or other configuration interface.

An application programming interface (API) 115 can be provided, through which application programs may interface with the VND 103. Application programs can be written for the computer's execution engine (e.g., an operating system or a virtual machine) that interfaces using API 115 to configure the VND to respond to each message based on the message contents and/or based on the transport protocol on which it was received. The VND mediates the interaction of the protocol and the underlying execution engine.

Figure 3:
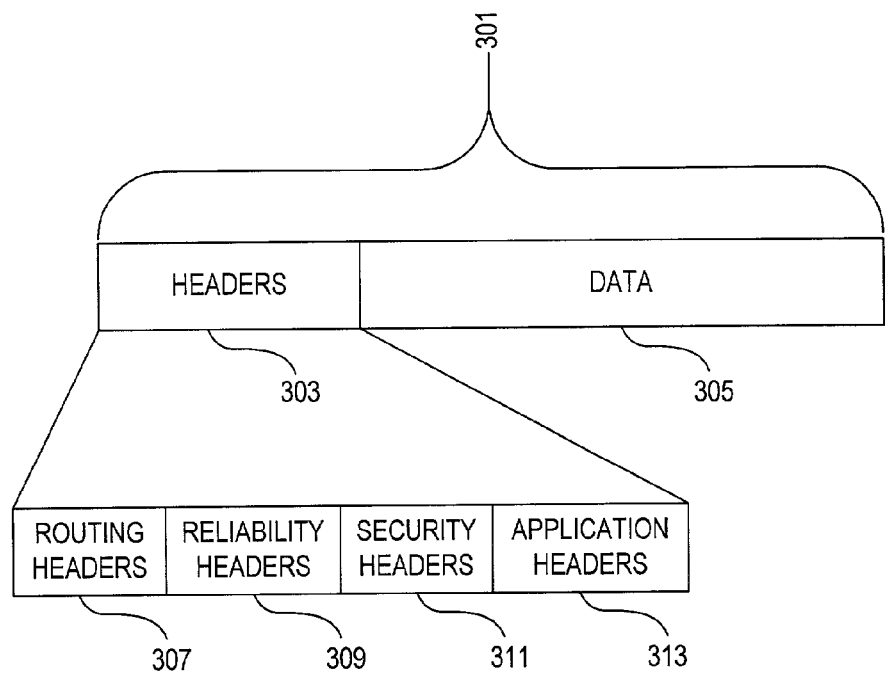
FIG. 3 illustrates a composable message protocol according to an embodiment of the invention.

FIG. 3 illustrates a composable message format used in an embodiment of the invention. Each message 301 includes a header portion 303 and a data portion 305. Headers include information about the information contained in the data portion. That is, headers are a type of metadata pertaining to the data portion 305 of the message 301. Neither the header portion nor the data portion is required to be a fixed length. The headers may include routing headers 307, reliability headers 309, security headers 311, and application headers 313. Routing headers 307 may include, e.g., a sender's address, a recipient's address, and any other information directed towards routing processes. Address fields may be populated with the virtual address of the entity or device to which the address refers. A virtual address is a logical address to which a physical or other logical address may be mapped. Reliability headers 309 may include any headers that ensure that packets arrive at their intended destination. Security headers 311 may include any headers that ensure that the message contents are not compromised to non-intended recipients. Integrity headers may be included with security or reliability headers, based on a particular application's needs. Application headers 313 may include any headers not previously accounted for, as defined by a network application.

In one embodiment, the message protocol is a composable protocol in that application programs can add new functional aspects as needed without interrupting the processing of preexisting message functionality. In one embodiment, headers are used to provide the new functional aspects. New functional attributes may be stored in one or more message headers. That is, new headers may be added to the existing message without disturbing the processing of the previous message, unlike conventional message protocol suites whereby one message protocol encapsulates another message protocol in order to include a new header (or functional attribute). Thus, the message protocol is extensible in that additional header fields may be added or removed by an application as needed to provide new functionality. This allows network applications to define new header fields and incorporate them into the message format without requiring that every network application be reprogrammed to understand each new message header. Each application program uses only those headers that specific application program is configured to understand. It may ignore those headers that it does not understand or cannot properly interpret.

The composable protocol may be a modified XML-based protocol, or it may be a modified TCP protocol whereby the additional headers are inserted into the data portion of each TCP message. When an application adds a new header to a message, the application may send a message to one or more VNDs that instructs each VND to create one or more handlers to route and/or dispatch based on the new header.

Each VND 103 may make routing decisions based on any header and/or data field within each message, or any combination of header and/or data fields within each message. Additional or fewer types of headers may be used. Each handler in each VND 103 provides instructions for routing based on message content.

For example, an application program may define and include an "action" header in each message to indicate the action that a user requests of a recipient. If a network user specifies the action subscribe and sets message data 305 to "baseball scores," the message may indicate to a first server that the sending user wants to subscribe to a baseball scores email list. Further, the action field may be populated by a virtual function name, mapping to a specific function at each machine on which it is received. If a network user specifies the action subscribe and sets message data 305 to "MSDN," the message may indicate to a second server that the sending user wants to subscribe to a physical magazine entitled *MSDN Magazine*. Thus, two applications may both use the action subscribe, each in a different manner, as defined by their respective subscribe functions.

Figure 11:
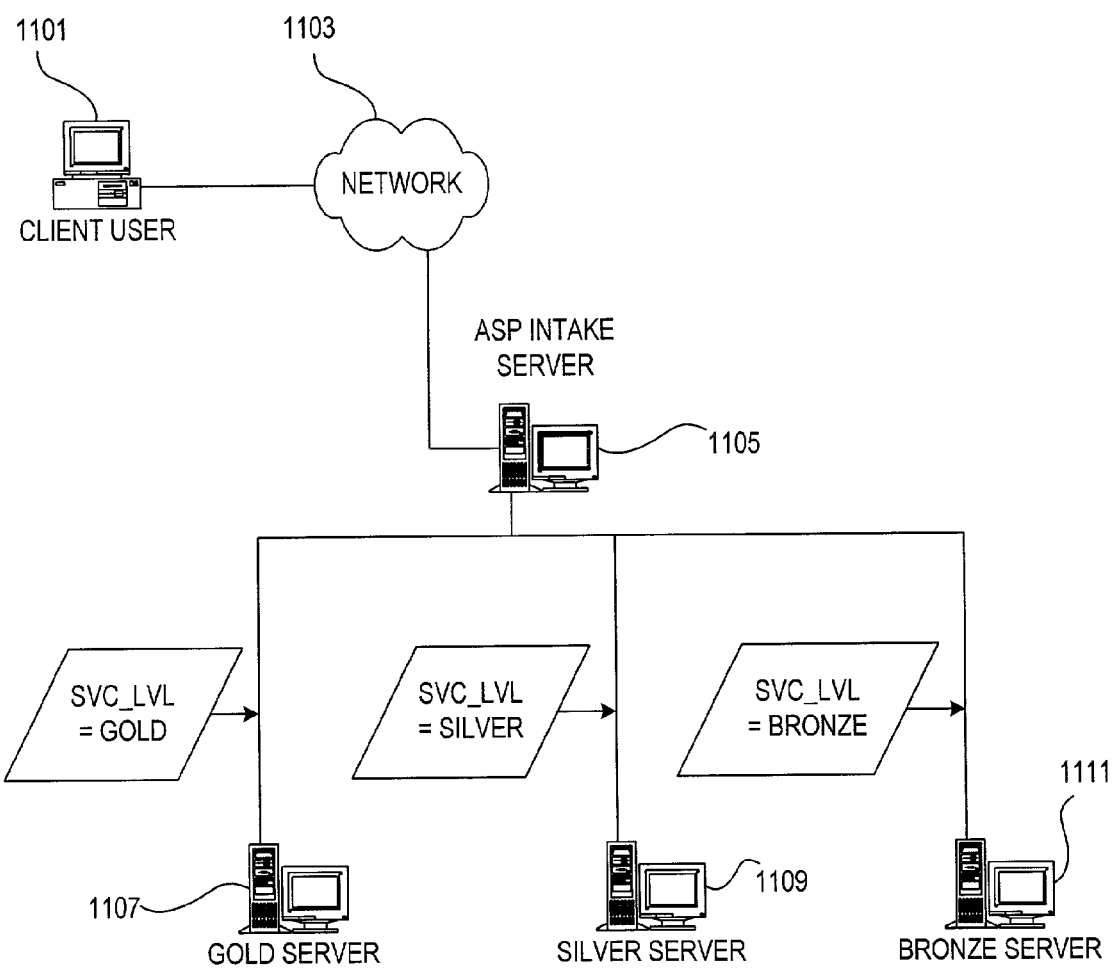
FIG. 11 illustrates network architecture according to an embodiment of the invention.

In another example, with reference to FIG. 11, suppose an application service provider (ASP) provides three levels of service to customers. The ASP may route messages to one of three different servers and/or applications, based on a level of service to which a customer has subscribed. The ASP may define and use a new application header called service_level or the like to indicate a level of service for each customer. The client application may populate the service level field with one of gold, silver, or bronze to indicate the level of service for which the specific customer has paid and/or otherwise subscribed. A master server 1105 may receive all incoming messages from customers 1101 via a network 1103. The master server dispatcher, e.g., VND 103, may then route the incoming customer messages based on the service level. Customers that order gold service may be routed to a fast response server 1107, a server that supports a complete set of services, or other premium-level server. Customers that order silver service may be routed to a mid-speed response server 1109, a server that supports selected services in addition to basic services, or other medium service-level sever. Customers that order bronze service may be routed to a slow response server 1111, a server that supports only basic services, or other low service-level server.

In another example, an application may include a header field named geographic_zone relating to a sending user's geographic location. Routing decisions may then be made based on the sender's physical location, so that messages are sent to a server located closest to the sending user. For instance, in a system that maintains two servers, the device may route a message to a first server in Seattle, Wash. when the geographic location header field indicates the sending user is located in Portland, Oreg., and may route the message to a second server in Chicago, Ill. when the geographic location header field indicates the sending user is located in Detroit, Mich. This avoids sending messages to distant servers when an equivalent server is nearby.

In another example, when a denial of service attack has been launched against one or more machines, a handler may be created that rejects all messages based on a 'credentials' field of each message. The 'credentials' field may or may not be the same as the message's 'from' field. For instance, the 'credentials' field may include a sending user's name, as well as authentication to prove that the sender is who he says he is, whereas the 'from' field may simply include a sender's IP address or logical name. The handler may be configured to accept a message when the message's 'credentials' field contains proper credentials for the sending machine. When a message is rejected, it may be completely ignored, freeing up resources to respond to legitimate messages.

Figure 4:
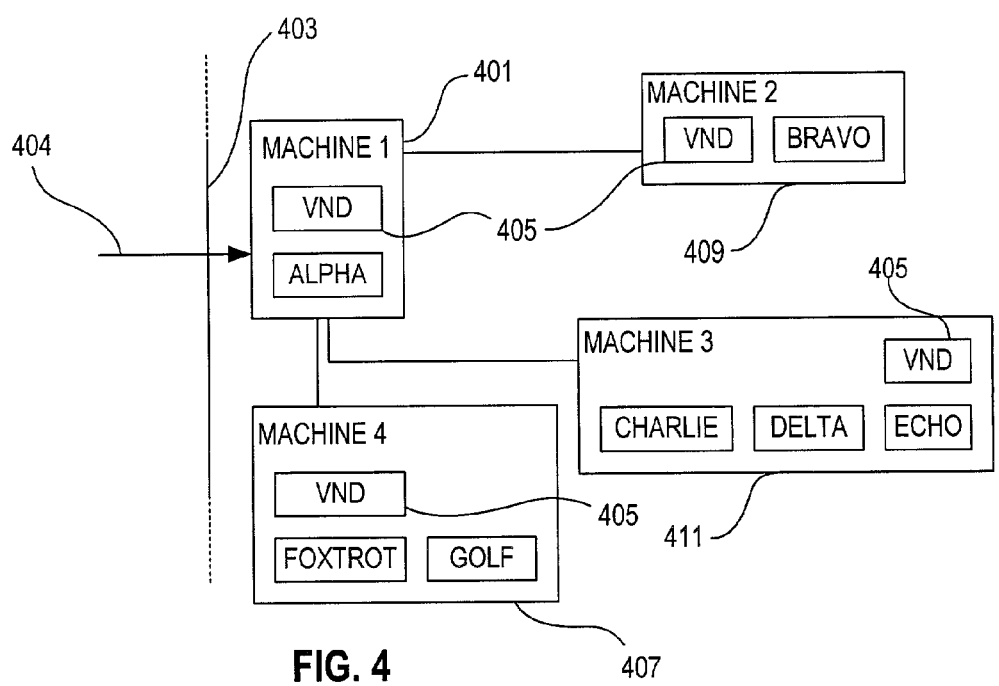
FIG. 4 illustrates a block diagram of a virtual network according to an embodiment of the invention.

In another example, with reference to FIG. 4, a virtual network may be configured to be self-healing. A machine 401 located behind firewall 403 may receive incoming messages on network connection 404. Machine 401 may be connected via a virtual network (i.e., a physical network configured with adaptive dispatchers and transport adapters as discussed herein) to other machines 407, 409, and 411. Each machine 401, 407, 409, and 411 includes VND 405. Each machine 401, 407, 409, and 411 may store one or more virtual locations. That is, machine 1 may store and execute a server known as 'alpha.' Machine 2 may house and store a server known as 'bravo.' Machine 3 may house and store servers known as 'charlie,' 'delta,' and 'echo.' Machine 4 may house and store servers known as 'foxtrot' and 'golf.' Each VND in the virtual network is configured with handlers that map each virtual location to its respective physical machine. For example, when device 401 receives a message directed to virtual location bravo, a virtual location mapping handler in device 401's VND instructs the VND to route the message to machine 2. However, because device 401 is the incoming source at a firewall, VND 405 in machine 1 may be configured with additional handlers to first check all incoming messages for viruses and to perform other security measures.

In order to make the virtual network self-healing, handlers may be created to regularly poll another machine or server to determine its network status. That is, where server 'golf' is a backup server for 'echo,' machine 4 may be configured to poll machine 3 at regular intervals in order to confirm that machine 3, and specifically server 'echo,' is functional. When machine 4 does not receive an acknowledgement from machine 3 (or 'echo') within a specified amount of time, e.g., ten seconds, machine 4 may initiate a failover sequence, whereby machine 4 begins sending routing messages to each machine's VND, indicating to each VND that when a message is received for 'echo' on machine 3, the message should instead be sent to 'golf' on machine 4.

Also using the architecture described in FIG. 4, when a server moves from one machine to another, e.g., from one IP address to a second IP address, the virtual mappings may be updated in each VND without requiring each application program operating on the network to be reconfigured. As application programs send messages to the server, each VND automatically reroutes the message to the server's new location. The virtual mappings may be updated manually, e.g., as a result of a new server being added to the system, or the mappings may be updated automatically, e.g., as a result of an automatic healing or adaptation event as described above. FIG. 12 illustrates a sample virtual mapping table. FIG. 13 illustrates the same table after a first machine hosting the www.foo.com website failed and the system adapted to the failure as described above, rerouting messages to another machine within the redundancy group.

Figure 5:
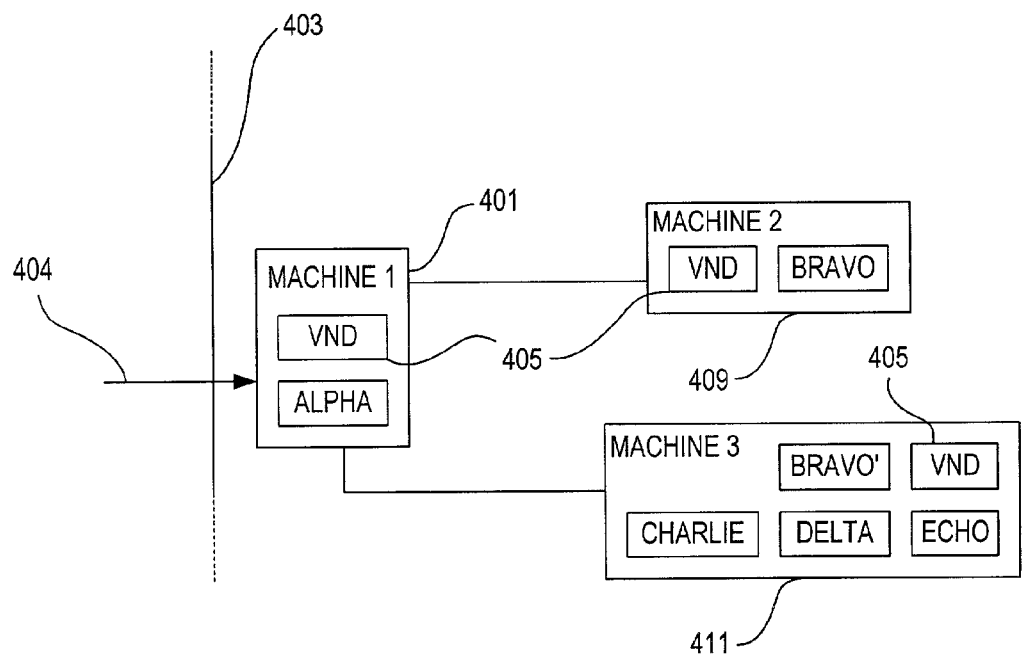
FIG. 5 illustrates a block diagram of a virtual network according to another embodiment of the invention.

With reference to FIG. 5, the virtual mappings also facilitate easy setup and testing of new servers and network applications. For example, server bravo on machine 2 may be a production email server (i.e., it is an email server presently used in the virtual network). The owner of the virtual network may want to test an upgraded email server with new or different features. Generally, in order to test the new server, a user would have to direct his email client to the new server. This may not be inconvenient for a single user, but it may be a major inconvenience to change every user's server name within a large organization when the new server goes live. Using the inventive system, the test server may be installed on machine 3, also named bravo', and referred to as bravo. Each VND may be configured with a handler that instructs it to route messages for bravo to machine 2. However, the same or a different handler is configured to route messages for bravo to machine 3 when the sender is a predetermined user, e.g., the network administrator that is testing the new server (bravo'). Thus, no reconfiguration of the test user's machine is required. In addition, when the new server bravo' is ready to be put into production, the network mappings may be changed by directing all bravo messages to machine 3, without interrupting any users' email service. Each user will transparently begin using the new email server because the virtual mapping has changed.

Figure 7:
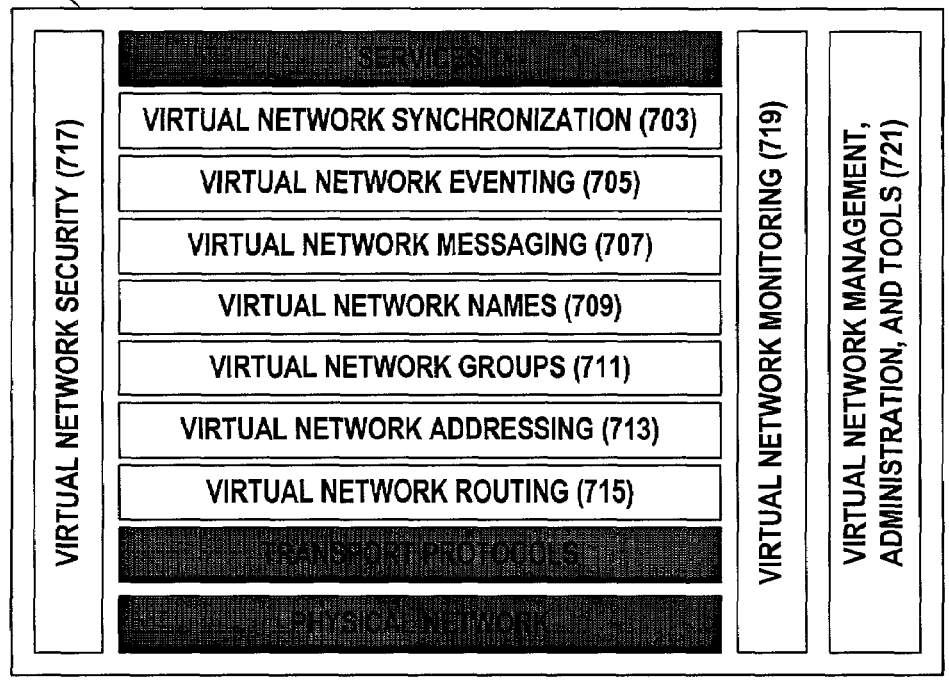
FIG. 7 illustrates a suite of services provided by a virtual network according to an embodiment of the invention.

With reference to FIG. 7, a suite of virtual network services may be provided to ensure that communications and services in the virtual network are secure, adaptable, reliable, self-healing, and platform independent. Virtual network synchronization services 703 ensure that distributed data within the network remains synchronized. Virtual network eventing services 705 create new routing and/or dispatch rules based on the occurrence or non-occurrence of an event. Virtual network messaging services 707 route messages according to virtual names and locations. Virtual network name services 709 provide name resolution services based on any substring of a virtual name. Virtual network group services 711 manage name-mapping tables. Virtual network addressing services 713 perform naming and routing services for fixed-length address names, e.g., IPv6 addresses. However, virtual network addressing services may be used with any flat address space of fixed-size addresses. Virtual network routing services 715 route and dispatch based on dynamic rules in conjunction with dynamic headers using a composable message protocol. Virtual network security services 717 may be provided across all levels of the network to ensure that message contents are secure and authentic. Virtual network management 719 may be performed across all levels, such as managing names, routing/dispatch handlers, eventing, etc. Virtual network monitoring services 721 allow a network administrator to monitor network usage, bandwidth, bottleneck points, and the like, as is presently known in the art.

Figure 9:
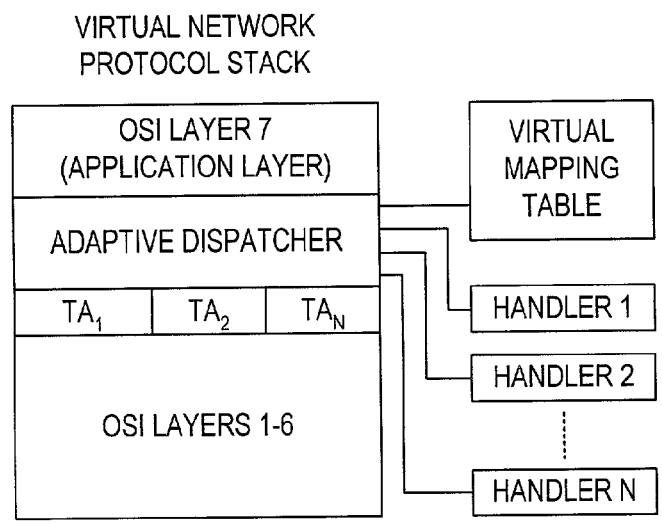
FIG. 9 illustrates a modified OSI seven layer network protocol stack according to an embodiment of the invention.

An embodiment of the invention may be based on a modified version of the seven-level open systems interconnection (OSI) network model, as illustrated in FIG. 9. One protocol stack that may be used with the OSI model is the TCP/IP protocol stack. The invention may insert an additional level of abstraction in the OSI network model, or any other network model, by inserting a layer between the top application layer and the layer immediately below the top application layer. The new layer, referred to as the virtual network (VN) layer, should be consistent across all applications so that the applications can interoperate in a uniform way as defined by the VN layer. A network into which a VN layer has been integrated is referred to as a virtual network. In one embodiment, the VN layer includes a virtual network dispatcher and any necessary transport adapters, routing and dispatching messages based on message handlers and a virtual address mapping table.

Using the above-described architecture, a network may route and dispatch messages based on different message content, on an individual message basis. The invention provides a network protocol that programmers may adapt and configure as needed using the API. Programmers, and programs using the API, may instruct VNDs how to route and dispatch incoming messages. That is, programmers send meta-messages to VNDs, where each meta-message is constructed according to the API and provides one or more routing and/or dispatching instructions.

Figure 8:
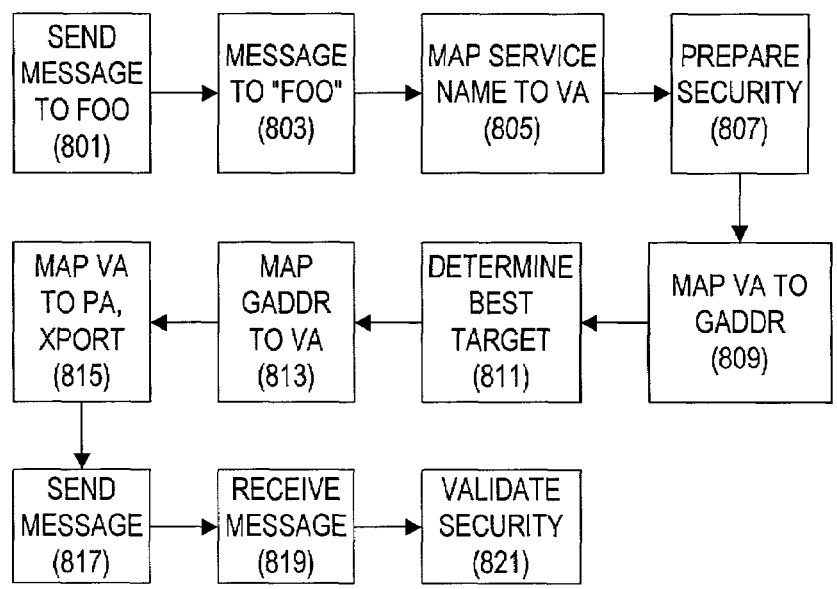
FIG. 8 illustrates a flowchart for performing message delivery according to an embodiment of the invention.

FIG. 8 illustrates a flowchart of a general routing procedure according to an embodiment of the invention. In step 801, a user decides to send a message to a service known as 'foo.' The machine creates the message to service 'foo' in step 803. In step 805, the service name 'foo' is mapped to a virtual address based on a virtual address mapping table. The message is secured as necessary in step 807. In one embodiment, security is performed using SOAP extensions such as those defined by the Web Services Security Language (WS-Security) and/or the Web Services License Language (WS-License). In another embodiment, a transformation is performed on the message to select relevant parts. A digest is computed over the selected parts and encrypted/signed by the sender. Portions of the message might be confidential. In this case they are encrypted using a shared key or a new key which is, in turn, encrypted for the recipient. In step 809, the virtual address is mapped to a group address (GADDR), when applicable. In step 811, the adaptive dispatcher (i.e., a VND) determines the best target and, in step 813, maps the GADDR to a virtual address. In step 815, the virtual address is mapped to a physical address, and, in step 817, the message is sent to the physical address. The recipient machine receives the message in step 819, and validates the security in step 821.

Figure 6:
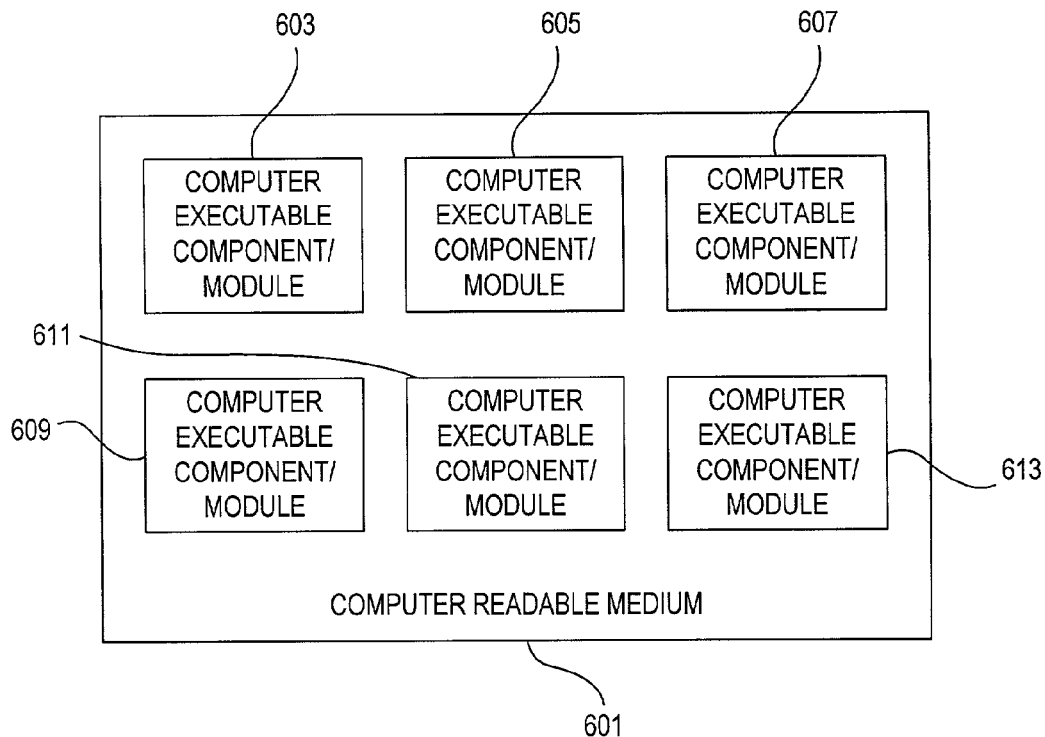
FIG. 6 illustrates a block diagram of a computer readable medium storing computer software according to an embodiment of the invention.

The inventive methods may be embodied as computer readable instructions stored on a computer readable medium such as a floppy disk, CD-ROM, removable storage device, hard disk, system memory, or other data storage medium. Alternatively, the inventive methods may be embodied in a combination of hardware and software, or in only hardware. FIG. 6 illustrates a block diagram of a computer readable medium 601 that may be used in accordance with one or more of the above-described embodiments. The computer readable medium 601 stores computer executable components, or software modules, 603-613. More or fewer software modules may alternatively be used. Each component may be an executable program, a data link library, a configuration file, a database, a graphical image, a binary data file, a text data file, an object file, a source code file, or the like. When one or more computer processors execute one or more of the software modules, the software modules interact to cause one or more computer systems to perform according to the teachings of the present invention.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

We claim:

1. An apparatus, comprising:
a message dispatcher that routes and dispatches messages, wherein each message is routed based on an arbitrary portion of the message's contents;
an interface through which application programs communicate with the message dispatcher to define the arbitrary portion of the message's contents; and
stored rules instructing the message dispatcher to route a first network message based on a first arbitrary attribute and a second message based on a second arbitrary attribute, wherein the second arbitrary attribute is different from the first arbitrary attribute,
wherein the first arbitrary attribute is selected from a set of header and data contained in each message,
wherein each rule is stored in a message handler, and
wherein the message dispatcher comprises computer executable instructions that, when executed, cause the data processing apparatus to perform the steps of:
 (i) polling a second apparatus at predetermined intervals; and
 (ii) receiving poll responses from the second apparatus;
wherein responsive to a predetermined condition comprising a failure to receive the poll responses, a first message handler sends an alteration message to alter a second message handler;
wherein the predetermined condition comprises a nonoccurrence of step (ii) for a predetermined amount of time.

2. The apparatus of claim 1, wherein the message dispatcher comprises a transport independent message dispatcher, and the message dispatcher communicates using a transport independent protocol.

3. The apparatus of claim 1 wherein the message dispatcher routes the first network message, addressed to a recipient from a first sender, to a first server, and wherein the message dispatcher routes the second network message, addressed to the recipient from a second sender, to a second server.

4. The apparatus of claim 1, wherein the message dispatcher routes messages using a virtual network protocol above a transport layer protocol.

5. The apparatus of claim 4, further comprising a transport adapter to convert messages between the transport layer protocol and the virtual network protocol.

6. The apparatus of claim 1, wherein the arbitrary portion of the message's contents comprises an application level header.

7. A data processing apparatus, comprising:
a message dispatcher module;
a transport adapter for interfacing the message dispatcher module to a transport protocol;
an interface through which application programs communicate with the message dispatcher module;
stored rules instructing the message dispatcher module to route a first network message based on a first arbitrary attribute of said first network message, and to route a second network message based on a second arbitrary attribute different from said first arbitrary attribute, of said second network message, wherein the first and second arbitrary attributes are selected from a set of headers and data contained in each network message;
wherein each rule is stored in a message handler, and wherein a first message handler sends an alteration message to alter a second message handler responsive to the occurrence of a predetermined condition, and wherein the message dispatcher module comprises computer executable instructions that, when executed, cause the data processing apparatus to perform the steps of:
(i) polling a second apparatus in first predetermined intervals; and
(ii) receiving poll responses from the second apparatus, wherein the predetermined condition comprises a nonoccurrence of step (ii) for a predetermined amount of time.

8. The data processing apparatus of claim 7, wherein the first arbitrary attribute comprises an application created header.

9. The data processing apparatus of claim 7, wherein when the predetermined condition is met, the message dispatcher alters the second message handler to redirect messages, that were originally addressed to the second apparatus, to a third apparatus.

10. The data processing apparatus of claim 9, wherein the computer executable instructions further cause the data processing apparatus to perform the step of sending routing information to a second message dispatcher, indicating the change of routing information corresponding to the second and third apparatus.

11. A method for routing network messages, comprising the steps of:
(i) routing a first network message based on a first attribute of the first network message;
(ii) routing a second network message based on a second attribute, different from said first attribute, of said second network message;
(iii) storing rules instructing a message dispatcher module to route the first network message and the second network message, wherein each rule is stored in a message handler, and wherein a first message handler sends an alteration message to alter a second message handler responsive to the occurrence of a predetermined condition, and wherein the message dispatcher module comprises computer executable instructions that, when executed, cause the data processing apparatus to perform the steps of:
(iv) polling a first data processing device in predetermined intervals;
(v) receiving poll responses from the first data processing device; and
(vi) when step (v) has not occurred for a predetermined amount of time, altering a message handler to direct messages originally addressed to the first data processing device to a second data processing device,
wherein the first and second attributes are arbitrarily selected from a set of headers and data of each network message.

12. The method of claim 11, further comprising the steps of:
(vii) receiving instructions comprising a message field and a field condition;
(viii) modifying a message handler based on the received instructions.

13. The method of claim 12, wherein, in step (vii), the instructions are received from a network application program.

14. The method of claim 12, wherein, in step (vii), the instructions are based on user-input.

15. The method of claim 11, wherein, in steps (i) and (ii), each message is output to a transport adapter that converts the message from a virtual network protocol to a transport protocol.

16. The method of claim 11, wherein, in step (i), the first attribute comprises an application created header.

17. The method of claim 11, further comprising the step of:
(vii) adding a new message handler to route messages based on a newly created type of message header.

18. The method of claim 11, wherein either of the first or second attributes correspond to a geographic location of the sender of the message.

19. The method of claim 11, wherein either of the first or second attributes correspond to a class of service of the sender of the message.

20. A network router comprising computer executable instructions that, when executed by the router, perform steps of:
(i) storing routing information received from a network application, wherein the routing information comprises a message field, a field condition, and a routing instruction;
(ii) receiving at least a first and a second network message;
(iii) processing each of the at least first and second network messages by comparing each of the at least first and second network messages to the stored routing information;
(iv) when a message field of each of the received at least first and second network message meets the field condition, performing the routing instruction for each of the at least first and second network message,
wherein the network router stores rules instructing a message dispatcher to route the first network message based on a first arbitrary attribute, and to route the second network message based on a second arbitrary attribute, wherein the second arbitrary attribute is different from the first arbitrary attribute, and wherein each rule is stored in a message handler, and wherein a first message handler sends an alteration message to alter a second message handler responsive to the occurrence of a predetermined condition, and wherein the message dispatcher comprises computer executable instructions that, when executed, cause the network router to perform the steps of:
(v) polling an apparatus in predetermined intervals; and
(vi) receiving poll responses from the apparatus,
wherein the predetermined condition comprises the non-occurrence of step (vi) for a predetermined amount of time.

21. The network router of step 20, wherein, in step (iv), the routing instruction comprises altering the corresponding at least first and second network messages.

22. The network router of step 20, wherein, in step (iv), the routing instruction comprises routing the corresponding at least first and second network messages based on an application level header.

23. A computer network, comprising:
a plurality of computers, each comprising:
at least one transport adapter that converts messages between a transport layer protocol and a network protocol; and
a message dispatcher that routes and dispatches messages based on an arbitrary portion of the message's contents, wherein the message dispatcher in each computer routes messages in a virtual network protocol over the transport layer protocol using the at least one transport adapter;

stored rules that instruct the message dispatcher to route a first network message based on a first arbitrary attribute and to route a second network message based on a second arbitrary attribute, wherein the second arbitrary attribute is different from the first arbitrary attribute, and wherein each of the stored rules is stored in a message handler, and wherein a first message handler sends an alteration message to alter a second message handler responsive to the occurrence of a predetermined condition, and wherein the message dispatcher comprises computer executable instructions that, when executed, cause each computer to perform the steps of:
  (i) polling an additional computer in first predetermined intervals; and
  (ii) receiving poll responses from the additional computer,
  wherein the predetermined condition comprises the non-occurrence of step (ii) for a predetermined amount of time.

24. The computer network of claim 23, wherein a first message dispatcher in a first computer is configurable for use with a new transport protocol by adding a new transport adapter that converts messages between the new transport layer protocol and the network protocol, without requiring a network application to be reconfigured for use with the new transport protocol.

25. A virtual network, comprising at least one virtualized component inserted between layer 7 and layer 6 of an OSI protocol stack, wherein said virtualized component provides a virtual network service, wherein the at least one virtualized component comprises a virtual network message dispatcher that routs and dispatches messages, wherein each message is routed based on an arbitrary portion of the message's contents, and wherein each rule is stored in a message handler, and wherein the virtual network message dispatcher comprises computer executable instructions that, when executed, cause a first data processing apparatus to perform the steps of: (i) polling a second data processing apparatus at predetermined intervals; and (ii) receiving poll responses from the second data processing apparatus, wherein a first message handler sends an alteration message to alter a second message handler responsive to the first data processing apparatus failing to receive the poll response in step (ii), said failure being a predetermined condition.

26. The virtual network of claim 25, wherein the virtual network message dispatcher routes messages according to virtual names and locations.

27. The virtual network of claim 25, wherein the at least one virtualized component comprises a synchronization module to ensure that distributed data within the virtual network remains synchronized.

28. The virtual network of claim 25, wherein the at least one virtualized component comprises a names module to provide name resolution services based on any substring of a virtual name.

29. The virtual network of claim 25, wherein the at least one virtualized component comprises a groups module to manage name-mapping tables.

30. The virtual network of claim 25, wherein the at least one virtualized component comprises an addressing module to perform naming and routing services for fixed-length address names.

31. The virtual network of claim 25, wherein the at least one virtualized component comprises a security module to ensure that message contents are secure and authentic.

32. The virtual network of claim 25, wherein the at least one virtualized component comprises an administrative module to monitor network performance and usage.

33. A computer network architecture comprising a plurality of data processing devices interconnected via a computer network, each data processing device comprising:

a virtual message dispatcher that routes messages to intended destinations and dispatches messages to appropriate applications at their intended destination, wherein each message is handled based on an arbitrary portion of the message's contents;

stored rules that instruct the virtual message dispatcher to route a first network message based on a first arbitrary attribute and a second network message based on a second arbitrary attribute different from the first arbitrary attribute, wherein a first intended routing destination is replaced by a second intended routing destination when the first intended routing destination fails to respond to a plurality of poll requests; and an interface through which OSI layer 7 application programs communicate with the message dispatcher to define the arbitrary portion of the message's contents by which each message is handled, wherein the virtual message dispatcher comprises a transport adapter for converting messages between a virtual network protocol used by network applications and a transport protocol used by the computer network, and wherein the virtual message dispatcher is configurable for use with a second transport protocol by adding a second transport adapter that converts messages between the second transport protocol and the virtual network protocol, without requiring any network applications to be reconfigured for use with the second transport protocol.

* * * * *